Patented Sept. 12, 1950

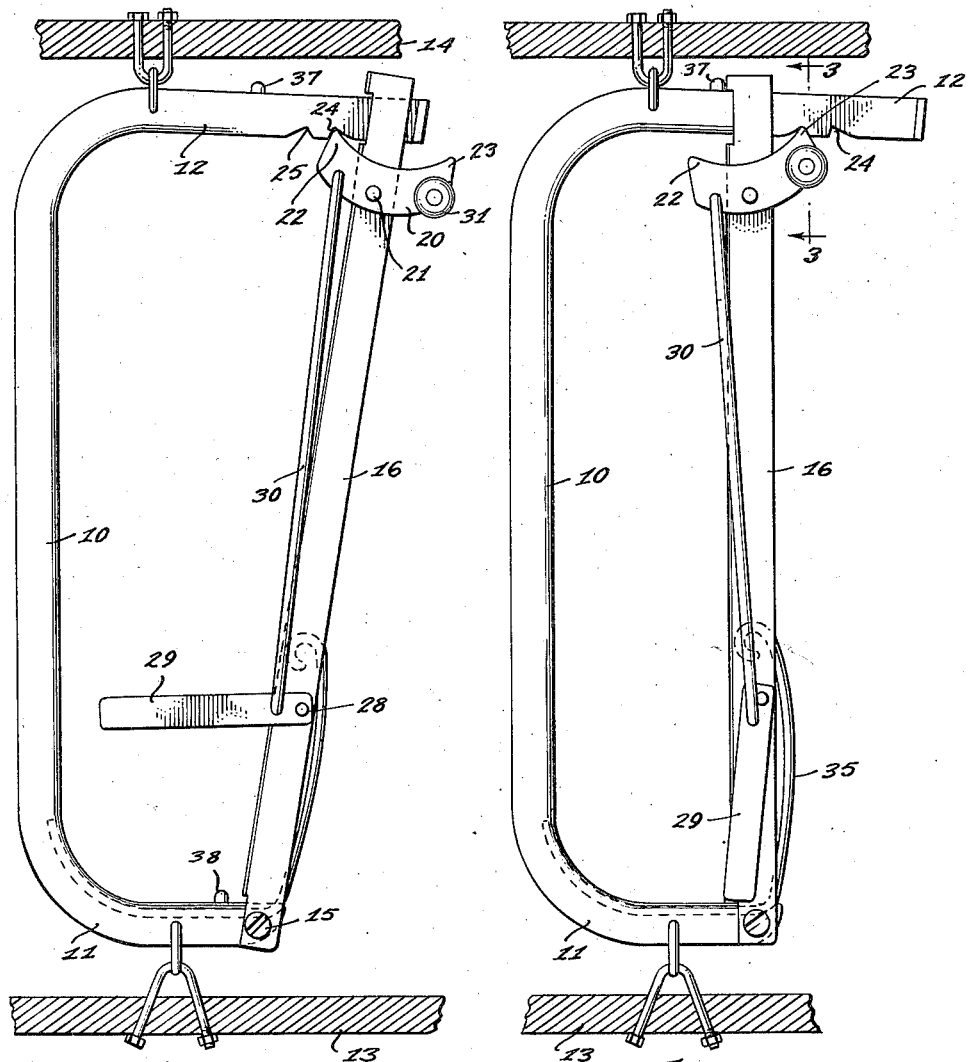
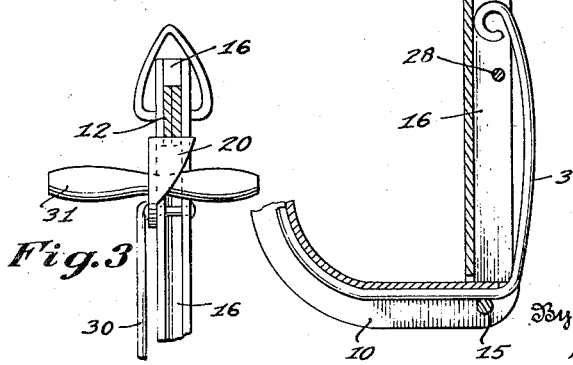

2,522,188

UNITED STATES PATENT OFFICE 2,522,188

DAIRY STANCHION

Billy J. Miller and True Sifferman, Republic, Mo.

Application April 1, 1947, Serial No. 738,604

2 Claims. (Cl. 119—150)

This invention relates to stanchions, and more particularly to a cattle stanchion that automatically locks in either open or closed position.

A principal object of this invention is the provision of a device of this character that is of simple, durable, and improved construction.

Other objects will be obvious to those skilled in the art from a reading of the accompanying description.

The drawings illustrate a preferred embodiment of the invention.

Figure 1 is a front elevation of the device in locked open position.

Figure 2 is a front elevation of the device in locked closed position.

Figure 3 is a vertical section of the latching means, taken along line 3—3 of Figure 2.

Figure 4 is a front view, partly in section, of the bottom of the device.

With particular reference to the drawings, it will be observed that the stanchion comprises a C-shaped arm 10, which may be made of a flattened longitudinally-opened pipe or similar tubular material, with the opening on the outside. The arm has a bottom portion 11 and a somewhat longer top portion 12. The bottom portion 11 and top portion 12 are secured to a lower support 13 and upper support 14, respectively, in the usual manner.

Pivoted to the lower portion 11 of the arm 10 on a horizontal pivot 15 is a gate 16, also formed of flattened longitudinally opened pipe, with the opening on the outside of the stanchion. The gate 16 is long enough to extend above the upper portion 12 of the arm 10, and the top of the gate 16 is apertured to ride freely over the upper portion 12 of the arm 10. An arcuate latch 20, pivoted on a horizontal pivot 21 on the gate 16, has two tongues 22 and 23, one of which is adapted to engage a notch 24 in the upper portion 12 of the arm 10 when the gate 16 is in the open position, as shown in Figure 1, and the other tongue 23 is adapted to engage another opposed notch 25 in the upper portion 12 of the arm 10 when the gate 16 is in the closed position, as shown in Figure 2, in a manner to be more fully described hereinafter.

The gate 16 bears a horizontal pivot 28 at a point where the cow is likely to rest her neck in order to reach her fodder, and a trip lever 29 is fulcrumed thereon. A rod 30 is attached to the lever 29 near the point 28 in such a manner as to be able to swing the lever 29 about the pivot 28. The upper end of the rod 29 is similarly attached to the latch 20, between the tongue 22 and the pivot 21. A double handle 31 is provided for the purpose of manipulating the latch 20.

A strong wire spring 35, held in place between the flattened ends of the arm 10 and the gate 16, by means of the pivot 15, is biased to urge the gate 16 counter-clockwise toward the arm 10, as viewed in the drawings. Stops 37 and 38 may be provided to limit the movement of the gate 16 in closed position.

The rod 30 is of such length that when the tongue 22 is in the groove 24, as shown in Figure 1, the trigger lever 29 will be horizontal, and the stanchion will be open; when the tongue 23 is engaged by the groove 25, as shown in Figure 2, the lever 29 will be substantially vertical, and the stanchion will be closed.

The device is first set to open position by a single movement of the handle 31 to the right to catch the tongue 22 of the latch 20 in the groove 24 against the urging of the spring 35. This will elevate the lever 29 about the pivot 28 to substantially horizontal position.

When the cow inserts her head over the lever 29, between the arm 10 and the gate 16, any tension on the lever 29 will disengage the tongue 22. The gate 16, under the bias of the spring 25, will swing counter-clockwise until the gate 16 abuts the stop 37 or 38. At this point, the lever 29 will be substantially vertical, and the latch 20 will have turned counter-clockwise sufficiently to present the tongue 23 to the notch 25, to thereby lock the gate 16 against outward movement.

What is claimed is:

1. A stanchion comprising a substantially vertical relatively stationary bar, top and bottom substantially horizontal bars secured to the substantially vertical bar and projecting laterally upon one side of the same, the top horizontal bar being provided in its bottom side with a pair of longitudinally spaced locking notches, a generally vertical gate bar extending longitudinally of the substantially vertical bar and spaced laterally therefrom and having its lower end pivotally connected with the bottom horizontal bar near the free end of the bottom horizontal bar, the top end of the gate bar extending above the top horizontal bar and being provided near its top end with a transverse opening receiving the top horizontal bar therethrough, an arcuate latch element pivotally mounted upon the gate bar near and below the top horizontal bar and extending laterally upon opposite sides of the gate bar and provided at its opposite ends with upwardly projecting tapered locking tongues, a substantially horizontal trip lever pivotally secured to the gate bar near and above the bottom end thereof and extending laterally inwardly of the gate bar and having its free end disposed near and spaced from the substantially vertical bar, a rod disposed adjacent to the gate bar and extending longitudinally thereof and having its bottom end pivotally connected with the trip lever near the end of the trip lever which is pivotally connected with the gate bar, the top end of the rod being pivotally connected with the latch element near the end of the latch element which is closest to the substantially vertical bar, and a spring connected with the gate bar and urging it toward a closed position nearest the substantially vertical bar.

2. An animal stanchion comprising a relatively stationary substantially vertical bar, top and bottom substantially horizontal bars secured to the top and bottom ends of the vertical bar and projecting laterally upon one side only of the vertical bar, the top horizontal bar being longer than the bottom horizontal bar and being provided in its bottom longitudinal edge with a pair of longitudinally spaced locking notches, a vertically swingable gate bar extending generally parallel with the vertical bar and spaced laterally therefrom and having its bottom end pivotally connected with the bottom horizontal bar at the free end of the bottom horizontal bar, the gate bar extending above the top horizontal bar and having a transverse opening near its top end for receiving therein the top horizontal bar, an arcuate locking plate pivotally mounted upon the gate bar near and below the top horizontal bar and projecting laterally upon opposite sides of the gate bar and provided at its opposite ends with upwardly projecting tapered locking tongues, the locking tongue at the end of the latch plate nearest the vertical bar being adapted to engage in the locking notch which is remote from the vertical bar while the locking tongue which is remote from the vertical bar is adapted to engage in the locking notch which is nearest the vertical bar, an elongated rod pivotally connected with the locking plate near the end of the locking plate which is nearest the vertical bar and laterally inwardly of the gate bar, the rod extending below the locking plate for a substantial distance and extending longitudinally of the gate bar, a substantially horizontal trip lever pivotally connected with the gate bar near and above its bottom end, the lever extending laterally inwardly of the gate bar and toward the vertical bar and being pivotally connected with the bottom end of the rod, and a generally L-shaped spring secured to the bottom horizontal bar and including an upstanding spring arm engaging the outer side of the gate bar and urging the same inwardly and toward the vertical bar.

BILLY J. MILLER.
TRUE SIFFERMAN.

REFERENCES CITED

The following references are of record in the file of this patent:

UNITED STATES PATENTS

| Number | Name | Date |
|---|---|---|
| 356,281 | Haley | Jan. 18, 1887 |
| 616,454 | Darnell | Dec. 27, 1898 |
| 734,532 | Foster | July 28, 1903 |
| 933,775 | Miley | Sept. 14, 1909 |
| 1,008,492 | Ramminger | Nov. 14, 1911 |
| 1,286,440 | Stevenson | Dec. 3, 1918 |